219-121.
05-29-73    OR    3,736,402    SR

United States Patent [19]
Mefferd et al.

[11] 3,736,402
[45] May 29, 1973

[54] AUTOMATED LASER TOOL

[75] Inventors: Wayne S. Mefferd, Palo Alto; Wendall C. Gates, Santa Clara, both of Calif.

[73] Assignee: Coherent Radiation

[22] Filed: Sept. 17, 1970

[21] Appl. No.: 73,142

[52] U.S. Cl..................219/121 LA, 331/94.5 Q
[51] Int. Cl..........................H01s 3/00, B23k 9/00
[58] Field of Search.............219/121 LA, 121 LM; 331/94.5 Q

[56] References Cited
UNITED STATES PATENTS
3,286,193  11/1966  Koester et al................331/94.5 Q
3,597,578  8/1971  Letchworth et al...........219/121 LA

OTHER PUBLICATIONS

Silvus, Bond, Swanson & Wachtell, "Precise Perforations Every Time," The Tool and Manufacturing Engineer, November 1969, pp. 46—49.

K. J. Dean, "Laser Beam Absorber," Vol. 12, No. 12, May 1970, IBM Technical Disclosure Bulletin, page 2131.

Primary Examiner—J. V. Truhe
Assistant Examiner—Hugh D. Jaeger
Attorney—Limbach, Limbach & Sutton

[57] ABSTRACT

An automated laser tool including a work table upon which a work piece is placed, a stationarily mounted laser, and optical means for directing the output beam from the laser along a controlled path to effectuate a cutting operation on the work piece.

4 Claims, 22 Drawing Figures

FIG. 1

Patented May 29, 1973

INVENTORS
WENDALL C. GATES
WAYNE S. MEFFERD

Patented May 29, 1973

INVENTORS
WENDALL C. GATES
WAYNE S. MEFFERD

Patented May 29, 1973

INVENTORS
WENDALL C. GATES
WAYNE S. MEFFERD

Patented May 29, 1973

INVENTORS
WENDALL C. GATES
WAYNE S. MEFFERD

Patented May 29, 1973

INVENTORS
WENDALL C. GATES
WAYNE S. MEFFERD

Patented May 29, 1973

INVENTORS
WENDALL C. GATES
WAYNE S. MEFFERD

INVENTORS
WENDALL C. GATES
WAYNE S. MEFFERD

AUTOMATED LASER TOOL

BACKGROUND OF THE INVENTION

In recent years lasers have changed radically from mere laboratory curiosities to highly reliable devices suitable for many industrial applications. One such application where a laser is particularly well suited is the use of a laser as a tool for cutting "soft" materials such as wood or plastic as well as "hard" materials such as metals.

Within the industries which manufacture "soft" goods, automation has generally become the rule of production. One costly exception to this rule is found in the area of making steel rule dies. A steel rule die consists of a pattern of knife-like blades or rules embedded in a holder made of a material such as plywood. In the carton industry, steel rule dies are used to cut patterns in flat cardboard sheets which are then folded and made into the desired cartons.

While automated machines cut and glue boxes, cartons, and other "soft" items at prodigious speeds, making dies for these machines is still a manual task relegated to separate company shops or outside diemaking concerns. To man these die shops, companies must hire skilled craftsmen (few exist) or invest much time and capital in long apprenticeships for novices. In recent years companies have had difficulty in hiring even apprentices and an already acute labor shortage has been compounded.

Even when the skilled manpower is available, die making is a time-consuming, laborious task. A jig or single piece die is the most stable type of die over long runs but it is almost impossible for a die maker to execute a number of interior cuts in the die with the accuracy required by today's high speed presses. To hold tolerances of few mils, most die makers are forced to comprise on stability and construct block dies. Of course, as with any non-automated manufacturing process, consistent accuracy is solely a function of the talents of the individual making the products. Even when block dies are used, the variability of human skills contributes greatly to the inaccuracy and inefficiency of present die making techniques.

SUMMARY OF THE PRESENT INVENTION

The present invention relates to an automated laser tool. In particular, the present invention relates to an automated laser tool, particularly useful for making steel rule dies, including a laser such as a $CO_2$ molecular gas laser, coupled with a gas jet assist mounted on a mechanical work table, and guided by numerically-controlled equipment.

In accordance with the present invention, the first step in the preparation of the cutting process is the production of the cutting sequence and dimensional information of the desired pattern. This information can first be written manually from a dimensioned drawing, which need not be to scale. The dimension of each end point of a proposed cut and the center points of circles are determined until the entire die has been plotted.

This information is then transferred onto a recording medium. For example the information can be transferred onto a plastic tape by an automatic typewriter with integral tape punching and reading facilities. One suitable typewriter is a Flexowriter which is also equipped with a repeat key so that it is not necessary to retype for subsequent cartons on a multiple die. This machine can also be used as an automatic repetitive writing machine.

Once the tape is prepared, simple controls turn on the laser, numerical control equipment, and gas jet. The work piece such as plywood, is placed on an improved workbed and positioned against one corner of the table to insure squareness, and then firmly clamped. The recorded tape is then inserted into standard numerical control equipment and the laser cutting operation proceeds automatically.

Controlled by information from the tape, a cutting head secured to a traveling beam, moves from a predetermined corner position to where the cutting is to begin. As the traveling beam moves away from this corner position a switch is activated which opens a number of shutters or reflective covers in the optical system, turns on the compressed air (1) to lower the cutting head and (2) provide an air purge to protect reflectors in the optical system, and activates a suction blower which is located beneath the work piece for removing smoke and debris from underneath the work piece.

The laser is activated and provides an output beam during an entire cutting operation. During a normal cutting operation, there are periods in which no cuts are made and it is therefore necessary to discontinue the laser beam periodically from the workpiece. Activating and de-activating the laser beam itself is not a satisfactory solution because of the response time of the laser. Thus, in accordance with the present invention, a novel shutter assembly is provided for reflecting the laser beam to an improved heat sink during those periods in which no cutting is required. When the laser tool is to cut, the shutter is rotated so as to provide an unobstructed path for the laser beam.

The machine then cuts a programmed pattern from contour, laser shutter, and cut width information on the tape. When finished the programmed tape returns the machine to the original corner position, shutting down the compressed air and suction blower as it goes.

If at a later date there are changes to be made in the cut pattern, the operator can re-program the tape by removing only the information which no longer applies and inserting the new information in the appropriate sequence.

With the improved laser tool of the present invention, it is possible to build block dies, but it is not necessary to do so. First, the improved laser tool can jig any size die with a consistent accuracy of ±0.002 inch. Secondly, the cutting speeds can be 10 times faster than those of conventional cutting techniques. Thirdly, the low operating cost and the simple repeatability of the numerical control equipment enables the user to build new dies rather than re-knifing old ones for the same cost. The feasibility of building only jig dies represents a distinct advantage since jig dies are inherently more stable than block dies and lock up problems associated with block dies are eliminated.

Another important feature of the laser tool of the present invention is the improved optical system utilized to precision position the laser beam anywhere in the work piece. The output beam is reflected by three improved 90° corner reflectors, and is then reflected in a vertical direction by a fourth corner reflector. The method of precisely aligning these mirrors forms still another aspect of the present invention.

The third mirror described above is transported on a traveling beam, which also holds the cutting head. The traveling beam rides on round ways which are mounted on improved precision adjustable mounts. Similarly the cutting head rides or round ways mounted to the traveling beam and it likewise is precision-mounted on adjustable mounting members.

DESCRIPTION OF THE PREFERRED EMBODIMENTS

Figure 1:
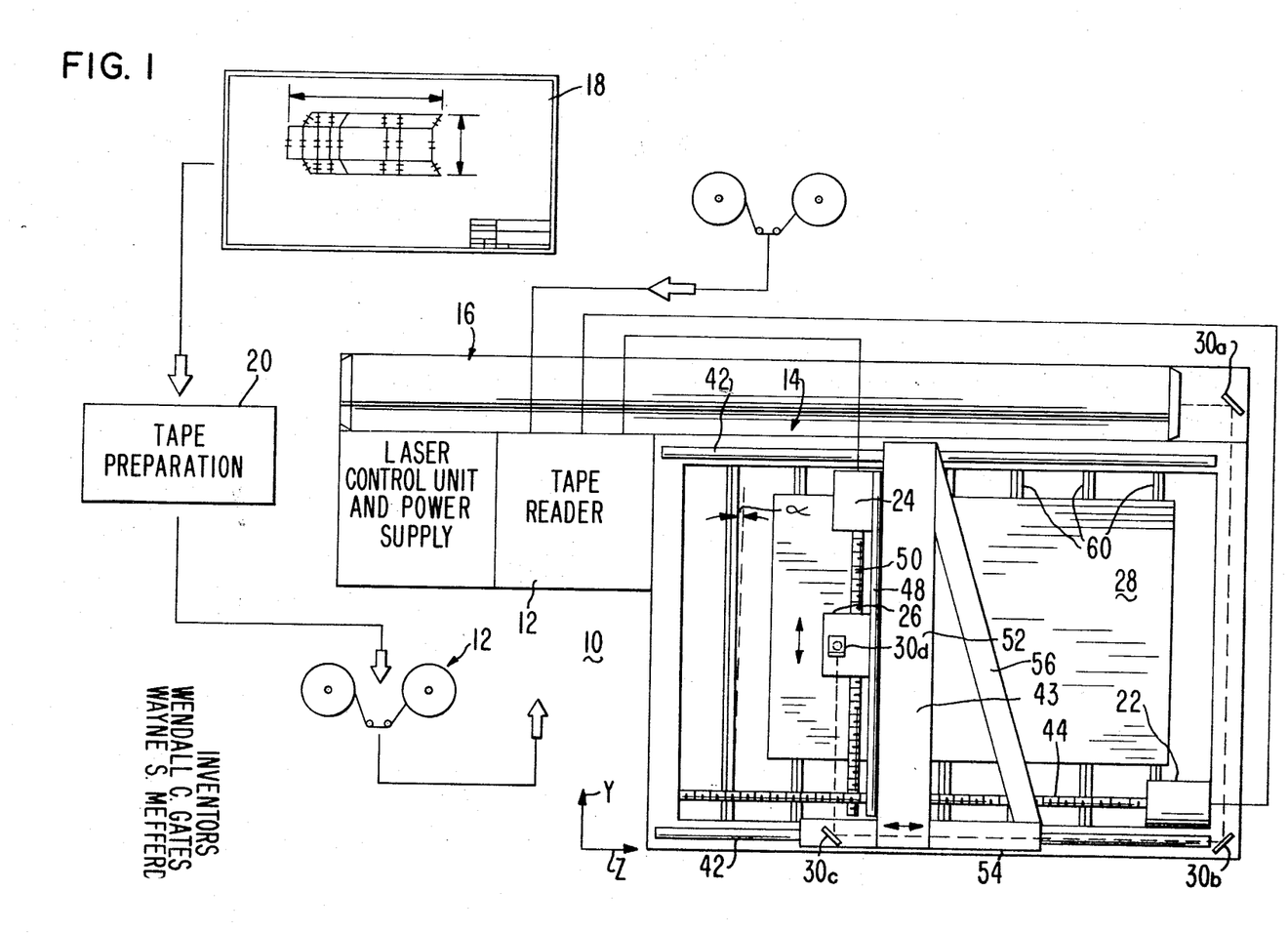
FIG. 1 is a schematic block diagram of an improved laser tool according to the present invention.

FIG. 1 is a schematic diagram of the laser tool 10 in accordance with the present invention. The laser tool 10 consists of three basic parts: a numerical control console 12, a mechanical worktable 14 and a laser 16.

In operation, the pattern to be cut into the work piece begins with the preparation of a fully dimensioned drawing 18 of the cut to be made. As previously described a programmer then numerically codes the drawing for the proper movement of the laser beam head. After coding, the information is transferred to a storage medium, such as punched tape, as indicated at 20.

In the numerical control console 12, information from the tape is translated into electrical signals in a well known manner to activate an X-direction motor 22 and a Y-direction motor 24 which operate, in a manner to be described subsequently, to move and guide a laser focusing nozzle or cutting head 26 above the work piece 28. The laser 16 generates an approximately 10 mm diameter laser beam which is transmitted by reflectors 30 to the cutting head 26. A gas jet is also provided to the cutting head coaxially with the laser beam. The gas jet functions to cool the top edge of the work piece, thereby reducing damage to the work piece, and increasing the depth of the cut.

Figure 2:
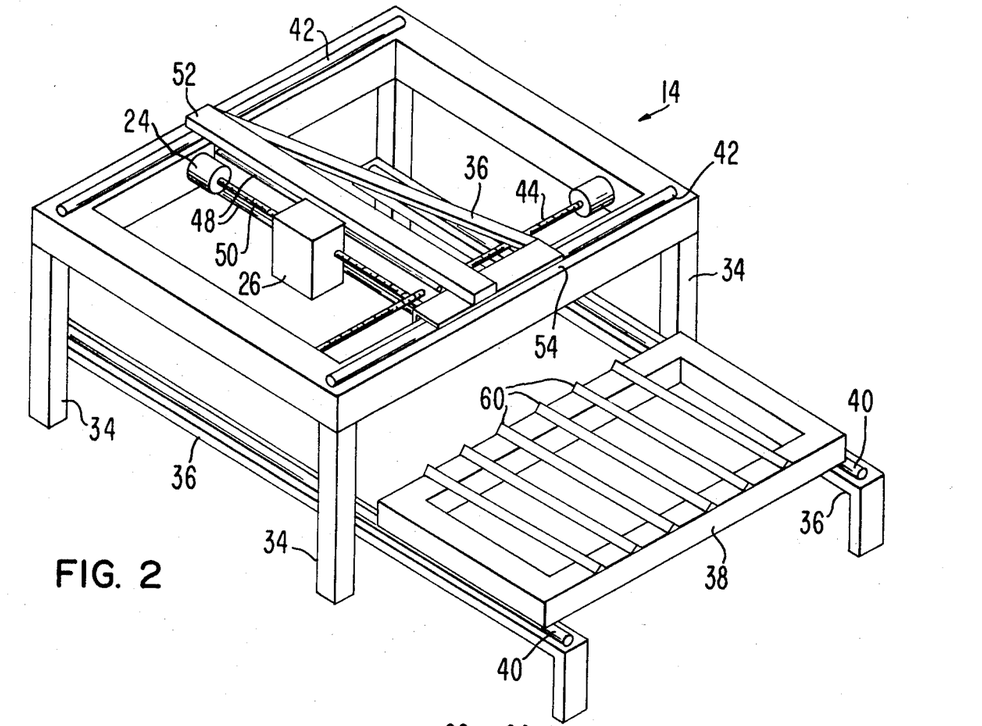
FIG. 2 is a perspective view of the laser tool of FIG. 1.
Figure 3:
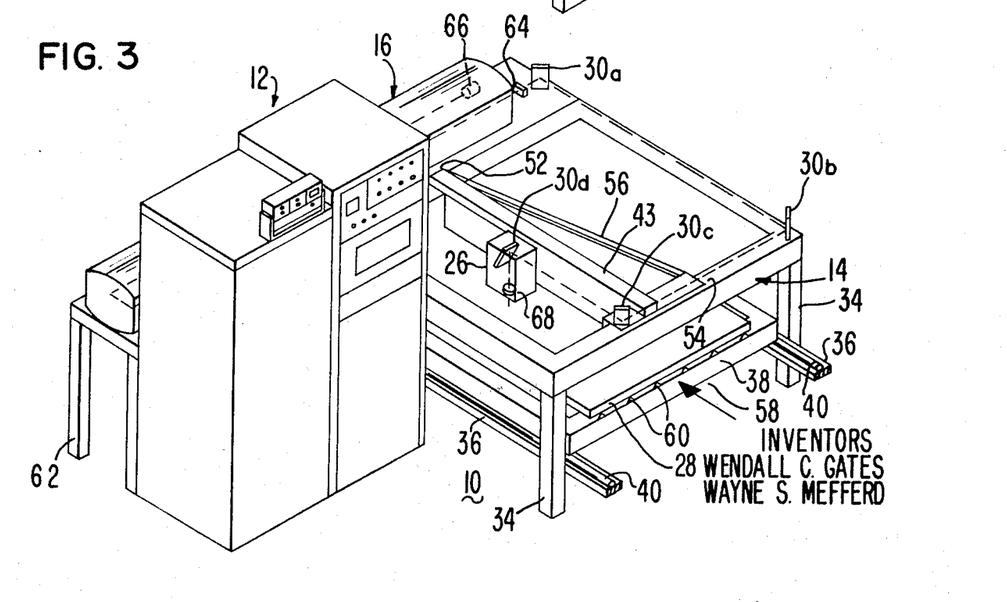
FIG. 3 is a perspective view of the worktable and traveling beam shown in FIG. 1.

Referring additionally to FIGS. 2 and 3, the mechanical worktable 14 consists of a frame made of steel or aluminum channels and having legs 34 made of steel tubing. Attached to the legs 34 are steel guide supports 36 upon which a worktray or workbed 38 is slidably secured by way of round ways 40 mounted to guide supports 36. When the tray is withdrawn, as illustrated in FIG. 3, the work piece or plywood in the case of a diemaker, is placed thereon and then the worktray is slid to the position shown in FIG. 2.

Mounted upon the top surface of the worktable 14 are two hardened steel roundways 42. These provide a straight and level path upon which a traveling beam 43, carrying the cutting head 26 moves. The traveling beam 43 is driven in the X-direction along the roundways 42 by means of a precision lead screw 44 by the stepping motor 22.

The traveling beam 43 carries another set of roundways 48. Along this set of roundways 48 travels the cutting head 26 driven by a precision lead screw 50 coupled with the Y-direction stepping motor 24. Note that the stepping motor 24 is secured to and forms a part of the traveling beam 43.

The traveling beam 43 consists of a perpendicular member 52, a slide member 54 and a brace member 56. The perpendicular member 52 of the traveling beam 43 is free to pivot with respect to the slide portion 54, and is held in position by the brace member 56. The length of the brace 56 may be adjusted (not shown) to create a perpendicular relationship between the two sets of roundways 42 and 48 respectively. Thus, the two directions of motion are orthogonal with the direction of motion of the cutting head 26 along the traveling beam 43 referred to as the Y-axis. By suitable combination of rotations of the motor control lead screws 44 and 50, the cutting head can trace any two dimensional contour required, including curves.

Proper cutting requires the absence of obstructions on the underside of the work piece. Obstructions cause reflection of the laser beam back onto the underside of the work piece. This causes uneven cutting, and scorched or burned areas on the workpiece. At the same time, the work piece must be kept reasonably flat to insure that the cut is orthogonal to the work piece.

Referring to FIGS. 1 and 3, non-interfering support is achieved by providing the worktray 38 with a bed of sharp-edged rails 60 which are strong enough to support the work piece 28 but which provide a minimum of interference with the laser and gas jet. The rails all have sharp edges to reduce the amount of surface area actually in contact with the underside of the work piece 28. The edge may be continuous as illustrated or may comprise a series of ridged portions.

To minimize the chance of a cut directly along the top of a rail 60, and since most cuts are made parallel with the X and Y axis, the rails 60 are laid at a small angle to the X-Y axis. It has been found desirable that an angle $\theta$ of from 2 to 5° from the Y-axis is preferred.

Underneath the workbed 38 is a hood (not shown) with suction to remove smoke and debris. The hood is attached to the underside of the workbed 58 and moves along with it.

The laser 16 is securely fastened to the worktable 14. The laser is supported by means of an auxiliary stand 62. Laser 16 is desirably a $CO_2$ or yag laser, such as a model 41 $CO_2$ laser manufactured by Coherent Radiation, the assignee of the present invention. The output beam from the laser 16 to the workpiece 28 is controlled by a shutter assembly 64 which will be described in more detail subsequently. Power is monitored continuously by an internal power meter 66.

Upon emerging from the laser, the laser beam is bent approximately 90° by the first corner mirror or reflector 30a. Although not shown, it is desirable to provide a shielding tube surrounding the beam for safety. The beam then travels to the opposite side of the table where it strikes the second corner reflector 30b and is reflected along the roundway 42. It is very important that the beam be exactly parallel with the X axis, and the means by which this alignment is achieved is subsequently described.

With this condition of parallelism, the impact of the laser beam upon the third mirror 30c mounted to the slide member 54 of the traveling beam 43 will not vary with the position of the traveling beam 43 along the roundway 42. A similar alignment is required using only mirror 30c to place the laser beam parallel to the traveling beam roundways 48. This insures that the impact of the laser beam upon the fourth reflector 30d does not vary as the cutting head 26 travels along the traveling beam 43. Fourth mirror 30d bends the laser beam vertically downward through the cutting head 26, through a focusing lens 68, and onto the work piece 28.

Figure 4:
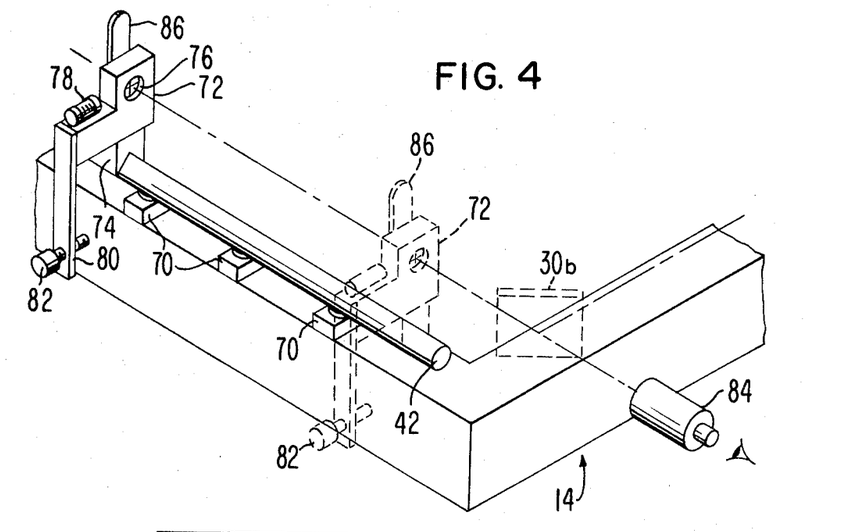
FIG. 4 illustrates optical alignment apparatus utilized in the present invention and the method of using the same.

Referring now to FIG. 4, each of the roundways 42 is attached to the worktable 14 with adjustable mounts 70. The ends of the roundway 42 are positioned at the center of the frame member 14 and alignment of the roundway 42 and corner reflectors 30a to 30c is accomplished by use of alignment tool 72. The alignment tool 72 consisting of a precision V-block 74 supporting a target 76 and a level vial 78. Attached to the alignment tool 76 is an arm 80 with an adjusting screw 82. When the V-block 74 is located on the roundway 42, and the vial 78 is leveled by means of the adjusting screw 82, the target 76 is brought to a precisely aligned position above the roundway 42.

A line of sight is established by "bucking in," by means of level and alignment telescope 84, through the target 76 at positions at each end of the roundway, as indicated in phantom. The alignment tool 72 is then placed at intermediate positions along the roundway and the roundway is adjusted vertically and horizontally by the adjustable mounts 70 to bring the target within the line of sight, thus straightening and leveling the roundway 42.

To align the traveling beam roundways 48 a precision pentaprism or optical square (not shown) is installed at the location of the third mirror 30c on the traveling beam 43. The alignment procedure is identical with that described above except that it is done through the prism which assures squareness of the roundways 42 and 43 respectively.

The alignment of the laser beam after being reflected from the fourth mirror 30d into a vertical direction is conducted in a similar fashion. The optical target 76 is replaced with a cross hair and the telescope 84 is replaced by the second mirror 30b. The first mirror 30a is adjusted to cause the laser beam to strike the center of the second mirror 30b, and mirror 30b is adjusted both laterally and angularly until the laser beam strikes the target identically at both near and far positions. The accuracy of the laser beam is conveniently judged by examining the burn hole made by the beam on a wood target piece 86 placed immediately behind the target cross hair 76. Alignment of the roundways 48 and mirror 30d is accomplished by using the third mirror 30c to shift the beam, the pentaprism having been removed.

Figure 5:
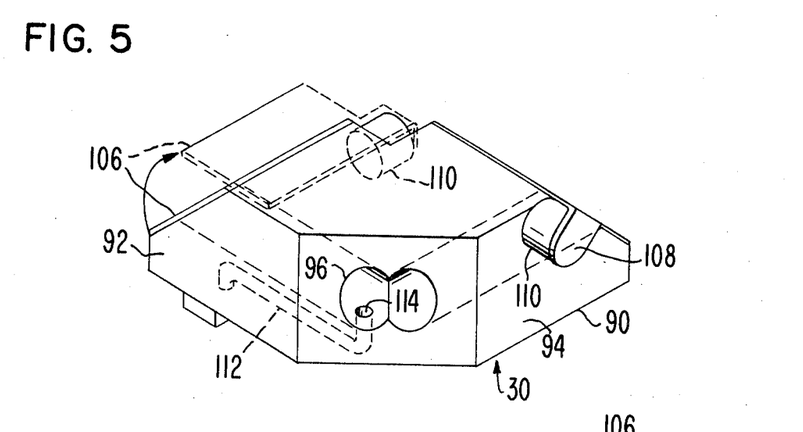
FIG. 5 is a perspective view of the improved corner reflector of the present invention.
Figure 6:
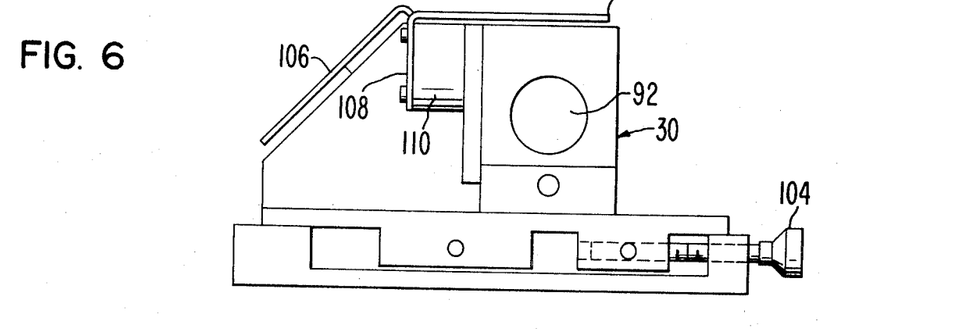
FIG. 6 is an end view of the corner reflector of FIG. 4.
Figure 7:
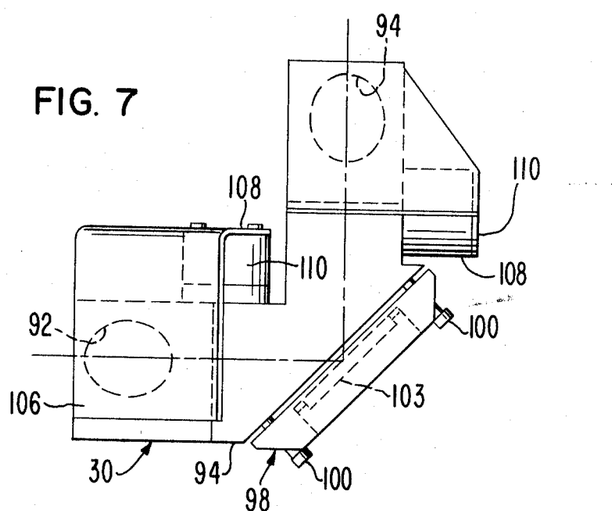
FIG. 7 is a top view of the corner reflector of FIG. 4.

Details of the corner mirror reflectors 30 are shown in FIGS. 5 through 7. The reflector 30 includes a corner body 90 having first and second intersecting bores 92 and 94 respectively. The bores from a 90° angle and intersection of the bores 92 and 94 form an exterior face 96 to which a reflector assembly 98 is mounted. The reflecting assembly 98 is secured by means of screws 100. A highly polished reflector 102 is secured to the reflector assembly 98 and is aligned by adjusting screws 104 in the manner described above.

Because of the smoke and debris resulting from the laser cutting operation, it is necessary to protect the surface of the reflector 102. Otherwise, the rate of transmission could be reduced below that necessary to sustain proper cutting. Further, the debris and smoke could cause permanent damage to the reflector if debris strikes the highly polished surface of the reflector.

In order to protect the reflector 102, protection means are provided which protect the reflector both during and after a laser cutting operation. When no cut is taking place, rotatable covers or shutters 106 are positioned in front of the entrances of the bores 92 and 94. Each of the covers 106 is mounted by means of a flanged portion 108 to a rotary solenoid 110. When a cutting operation takes place, a command is given to each of the rotary solenoids 110 to rotate each of the covers 106 to a position which does not obstruct the entrances to the bores 92 and 94.

During a cutting operation, additional protection means must be provided to protect the reflector surfaces. This is accomplished by the use of an air purge within close proximity of the reflectors to keep the debris and smoke from the surface of the reflectors 102. For this purpose an air conduit 112 extends within the corner block 90. Conduit 112 has one end 114 which is in close proximity with the reflector 102. The other end of the conduit is connected to a suitable supply of compressed air (not shown). During a cutting operation and with the covers 106 in the open position, a continuous stream of compressed air flows through the conduit 112 and out the end 114 to maintain the mirror dirt-free as well as to clear the air within the bores 92 and 94 to reduce scattering of the laser beam light.

Referring to FIGS. 8 through 13, the cutting head 26 is composed of three basic assemblies: a lens assembly 122, a nozzle assembly 124 and a tracking assembly 126.

Figure 8:
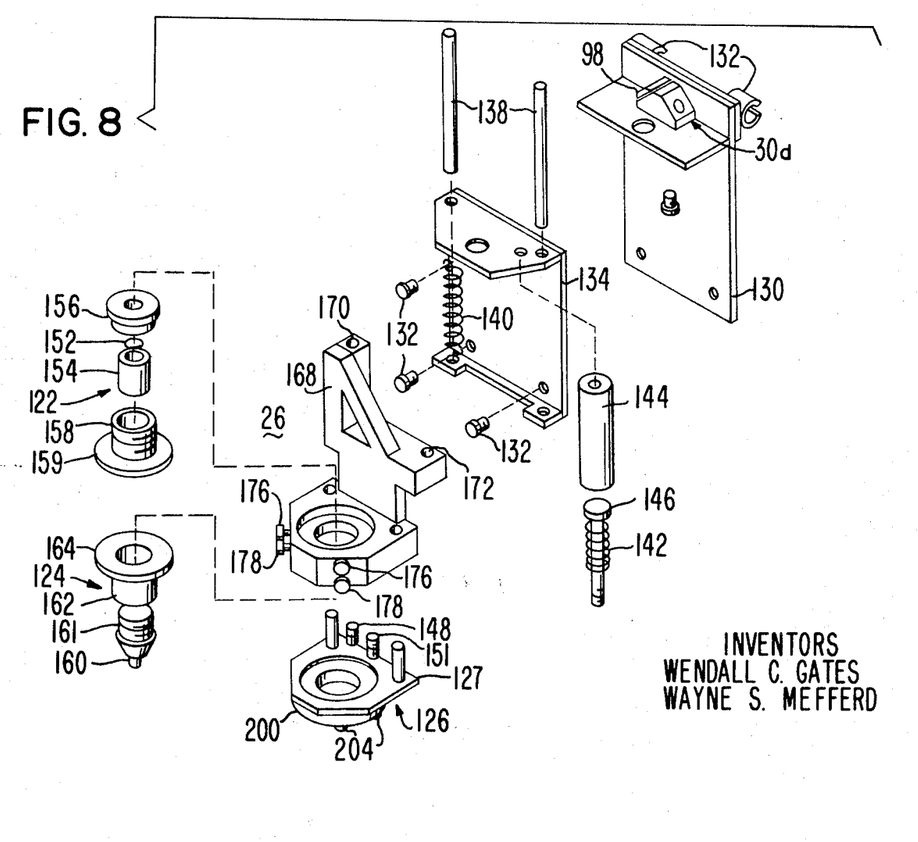
FIG. 8 is an exploded view of the cutting head assembly of the laser tool of FIG. 3.
Figure 9:
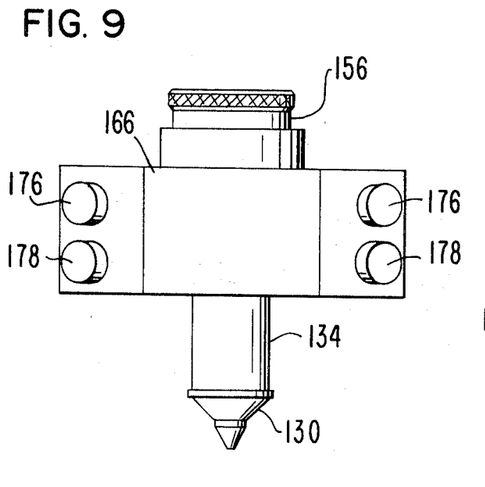
FIG. 9 is a side view unexploded of the cutting head illustrated in FIG. 8.

The cutting head includes a base plate assembly 128 which consists of a flat plate 130 having three ball bushing pillow blocks 132 (only two which are shown). The pillow blocks 132 ride along the traveling beam roundways 48. Provision is made for mounting the fourth reflector assembly 30d, which is vertically adjustable and for mounting the leadscrew 50 (neither of which is shown). The lower pillow block (not shown)

may be adjusted away from the plate to level the plate 130 in the A direction.

A roundway plate 134 is mounted to the base plate 130 by means of three screws 132. The screws are used for adjusting the level of the ways in the B direction. The way plate 134 holds roundways 138 which are used to permit vertical motion of the cutting assembly 122.

When the laser tool is not in use, the lens assembly 122, nozzle assembly 124, and tracking assembly 126 are retracted vertically on the roundways 138 by the combined forces of a counter-balance spring 140 and a compression spring 142. To lower the cutting assembly, air pressure is applied within a piston chamber 144 which houses a piston 146. The action of the piston compresses the spring 142 allowing the lens assembly to lower due to gravity until the tracking assembly 126 is in contact Lens assembly 122 is maintained at close levels to the workpiece by adjusting screw 148. Medium and upper level adjustment screws 151a and 151b respectfully contact plungers from solenoids 149 and 149b when activated. That is, if it is desired that the lens assembly be at a maximum distance range from the workpiece, solenoid 149b is activated.

Figure 10:
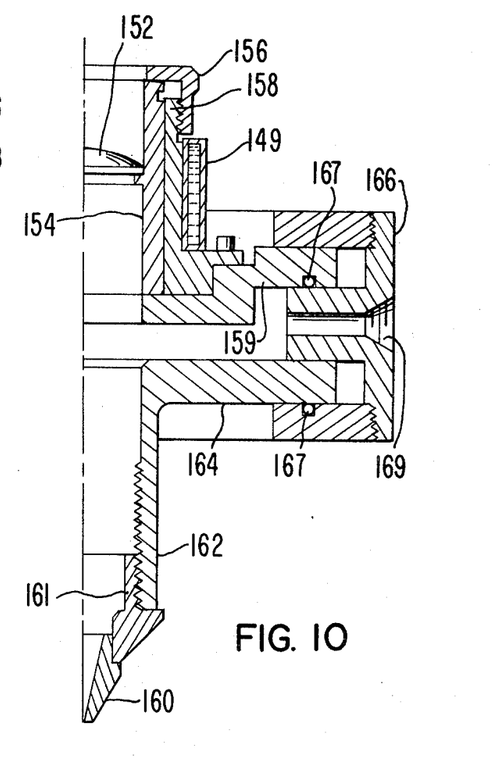
FIG. 10 is a view, partially in section, of the cutting head of FIG. 9.
Figure 11:
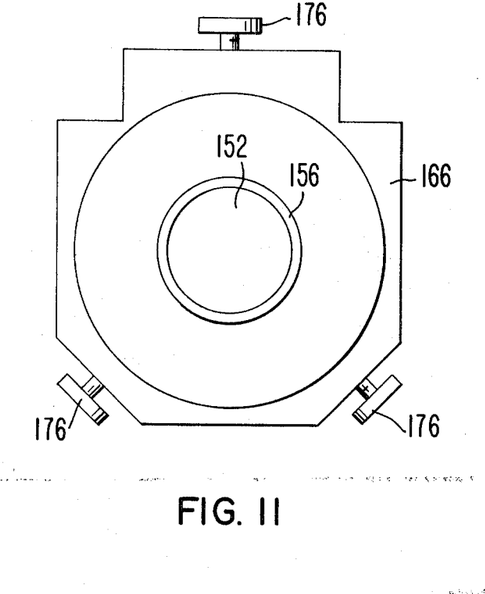
FIG. 11 is a top view of the cutting head of FIG. 9.

Referring additionally to FIGS. 9–13, lens assembly 122 contains a water cooling jacket 149 (FIG. 10). A lens 152 is held in a lens cell 154. The lens cell 154 is retained by a threaded cover member 156. The cover member 156 screws onto a lens holding cylinder 158. The lens holder cylinder 158 includes a flanged portion 159.

The nozzle assembly 124 includes an adjustable nozzle piece 160 which has a threaded portion 161 and is screwed into a nozzle holder cylinder 162 which includes a flanged portion 164. The flanged portion 159 of the lens holder 154 and the flanged portion 164 of the nozzle holder 162 are threaded circumferentially. Each is then screwed into a housing 166 which includes O-ring seals 167. The housing 166 includes an orthogonal member 168 which includes two bores 170 and 172 therethrough which the roundways 138 pass. Mounted within the housing 166 are lens adjustment screws 176 and nozzle adjustment screw 178. An air inlet 169 is provided in the housing 166 for the gas jet.

Figure 14:
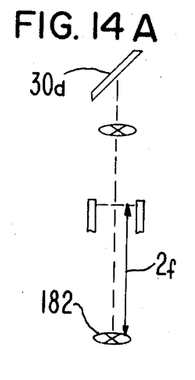
FIG. 14a, 14b and 14c are schematic representations illustrating the manner in which compensation is made for the FIG. 15 is a side view of an improved adjustable round way mount upon which the traveling beam moves.

To properly aim the laser beam onto the workpiece, it is necessary to account for any eccentricity of the lens 152. Eccentricity refers to the difference between the geometric center and the actual or optical center of the lens. Referring now to FIGS. 14a through 14c, two cross hair targets 180 and 182, the former slightly below the fourth mirror 30d and the other on a removable adapter (not shown) twice the focal length below the lens 180, are placed along the optical path. Mirror 30d is adjusted to position the laser beam through the two cross hair targets 180 and 182 without the lens 152 in position. This is shown in FIG. 14a.

In FIG. 14b, the lens 152 is installed and adjusted in the horizontal plane until the spot from the laser beam is once again on the lower cross hair 182, insuring alignment through the optical center of the lens 152, as shown in FIG. 14c. A laser beam power meter is then substituted for the lower cross hair target 182 and the nozzle adjusted for maximum power transmission.

Figure 12:
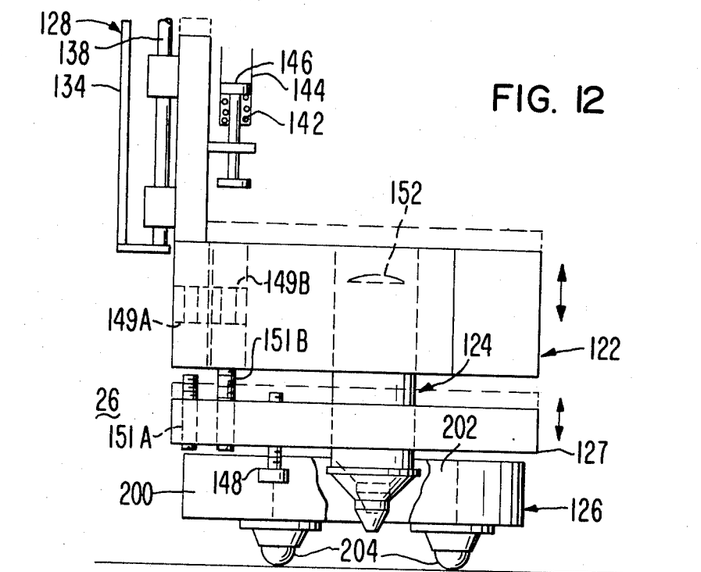
FIG. 12 is a side view of the cutting head shown in FIG. 8.
Figure 13:
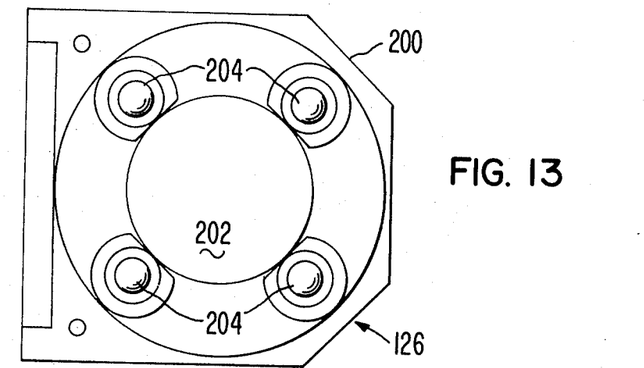
FIG. 13 is a bottom view of the tracking assembly of FIG. 12.

The tracking assembly 126 insures that the lens 152 is maintained at a constant distance above the workpiece. This insures that the width of the cut is constant during the cutting operation. The tracking assembly 126 consists of a housing member 200 having a centrally located bore 202. Secured within the housing 200 are a plurality of ball casters 204 which allow the tracking assembly 126 to travel smoothly on the workpiece surface.

In operation, when air pressure is applied to the piston cylinder 144, the cutting head 26 is lowered in the manner previously described to the surface of the workpiece. A jet of air is also provided through the nozzle assembly 124. When the laser shutter 64 is open, the laser beam is focused by the lens 162 through the nozzle assembly 124 and onto the workpiece. As a result of the combination of the laser beam and the gas jet, a cut is caused by evaporation of the material. Vaporized material is carried down through the workpiece producing a narrow, and, if proper adjustments are made, parallel-sided cut. The path of the cut and the operation of the laser shutter 64 are controlled by operation of the numerical control console 12 as previously described.

The width of the cut may be varied by varying: 1) the laser power; 2) cutting speed; 3) nozzle orifice size; and/or 4) the height of the lens above the workpiece. Constancy of cut width is achieved by maintaining these factors constant plus maintaining constant air pressure to the gas jet. One of the most difficult of these factors is maintaining the lens 152 height above the workpiece. However, by use of the improved tracking assembly 126, the lens is maintained at a constant distance above the workpiece.

Figure 15:
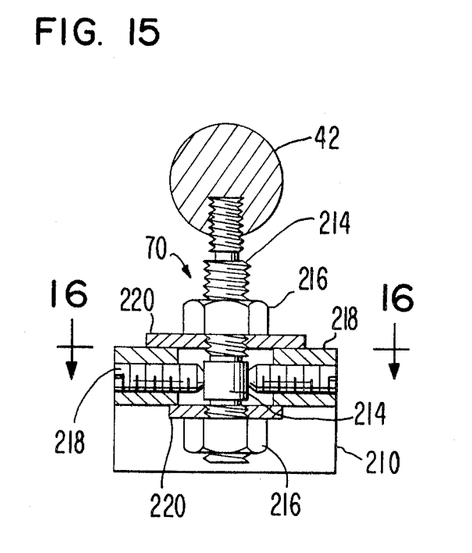
Figure 16:
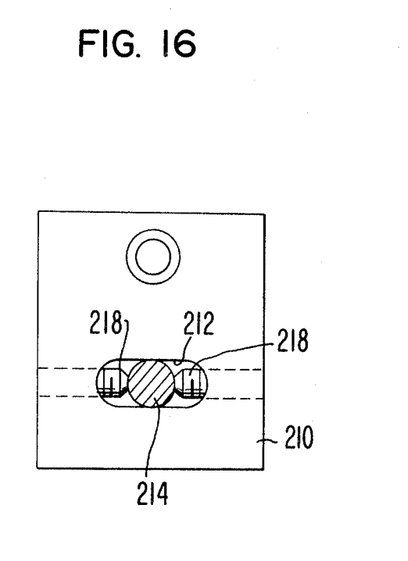
FIG. 16 is a bottom view of the round way mount of FIG. 15.

One of the adjustable way mounts 70 is shown in more detail in FIGS. 15 and 16. As previously described, the way mounts 70 secure the roundways 42 to the worktable 14 and permit precise horizontal and vertical adjustment thereto. The way mount 70 includes a way mount mounting block 210 which is fastened to the work frame 14 by suitable means such as screws. The block 210 includes an opening or slot 212 through which extends a threaded stud 214 which holds the roundway 42. The slot enables the threaded stud 14 to be moved laterally. Vertical adjustment is affected by opposing nuts 216, and the horizontal or lateral adjustment by the opposing screws 218. Thrust washers 220 are required under the nuts 216. The block 210 is undercut for wrench clearance. Where the main frame 14 member is sufficiently wide, a wrench clearance hole may be bored through the bottom of the block made flat.

Figure 17:
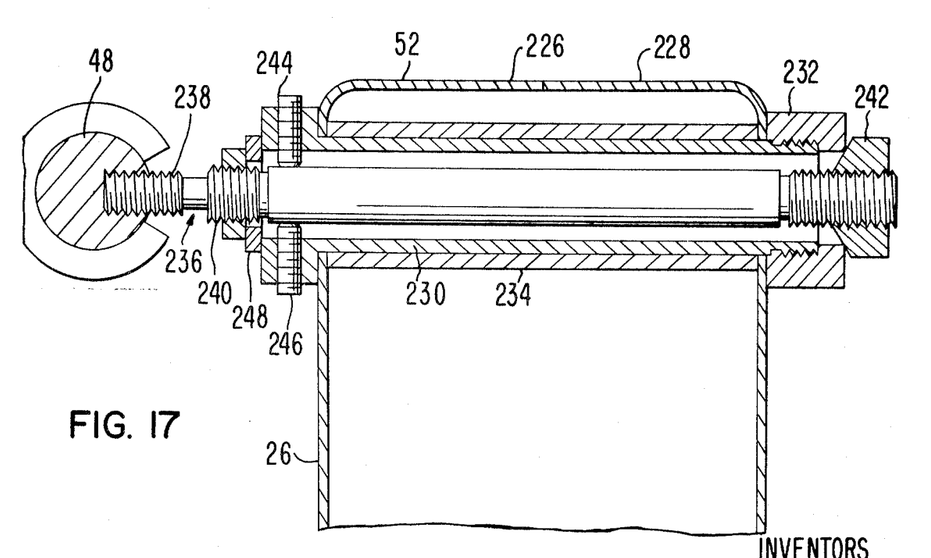
FIG. 17 is a side sectional view of the traveling wave beam of FIG. 3.

FIG. 17 shows a cross-sectional view of the perpendicular member 52 of the traveling beam 26. Perpendicular member 52 is constructed of two U-shaped sheet metal halves 226 and 228 aligned and held together by hollow bolts 230 and fastened by nuts 232 against spacer tubes 234. The roundways 48 are held in place by adjustable mounts 236. The roundway 48 is held by a threaded stud 238. Horizontal adjustment is affected by the opposing nuts 240 and 242, and vertical adjustment by the opposing screws 244 and 246. The conical fit of the nuts 232 and 242 acts to center the threaded stud 238. A thrust washer 248 is desirably provided.

Figure 18:
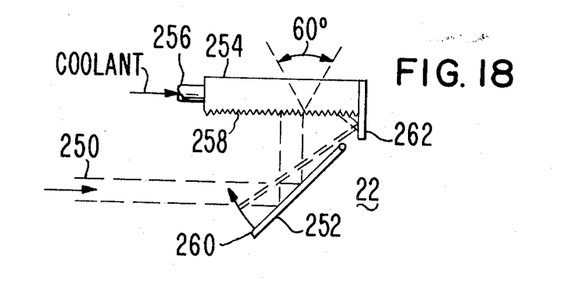
FIG. 18 is a schematic illustration of the laser shutter assembly according to the present invention.

FIG. 18 is a generalized representation of the laser shutter assembly 22. It has been found that it is more desirable to allow the laser to be operational at all times and to provide a shutter for allowing light to the workpiece. As previously described it is not practical to turn the laser 16 on and off during the cutting operation. The amount of time required would be prohibitive due to the time required for the laser to "warm-up." Thus in the present invention, the laser continuously provides an output beam during operation and the beam therefrom is deflected or obstructed so that it cannot reach the workpiece except when it is desired to cut.

Thus in FIG. 18, showing a generalized representation of the shutter assembly 22, the laser beam 250 is deflected by a polished aluminum, highly reflective shutter 252 onto a water-cooled heat sink 254. Water, or other coolant, enters through a tube 256 into the interior of the heat sink 254 for removal of heat therefrom.

The heat sink 254 is made as non-reflective as possible by the use of a grooved surface 258. It has been found that the grooves should be set at an angle of 60° from the surface of the heat sink. At this angle, a laser beam striking the surface of a groove is reflected many times before reaching the valley of the groove. Consequently, the amount of the laser beam reflected by is very small. Also, to reduce the amount of reflection the heat sink is maintained at a low temperature by the circulating coolant, and the surface is coated with an absorbing material such as a suitable oxide or a paint.

The geometry of the shutter has been selected so as to minize stray reflectance. In particular, the shutter 252 is rotated into the oncoming laser beam 250. The leading edge 260 of the shutter 252 is rounded to further disburse any reflections. A blocking plate 262 is located perpendicularly to the heat sink 254. The blocking plate 262 reflects back a substantial portion of the beam at a time when the shutter 252 is being rotated in or out of the path of the laser beam 250. Note that when the shutter 252 is roughly parallel with the heat sink 254 the beam 250 is free to pass through the shutter assembly 22 and to the first corner reflector 30a.

Figure 19:
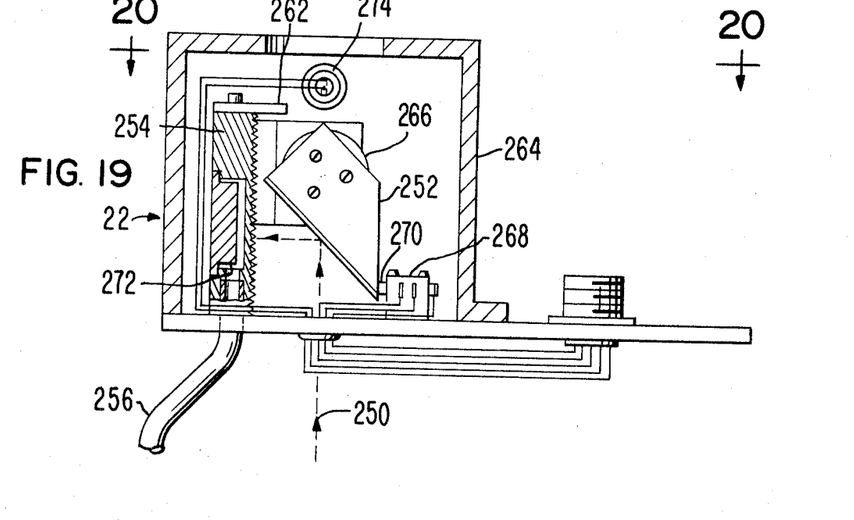
FIG. 19 is a detailed top view of the shutter assembly of FIG. 18.
Figure 20:
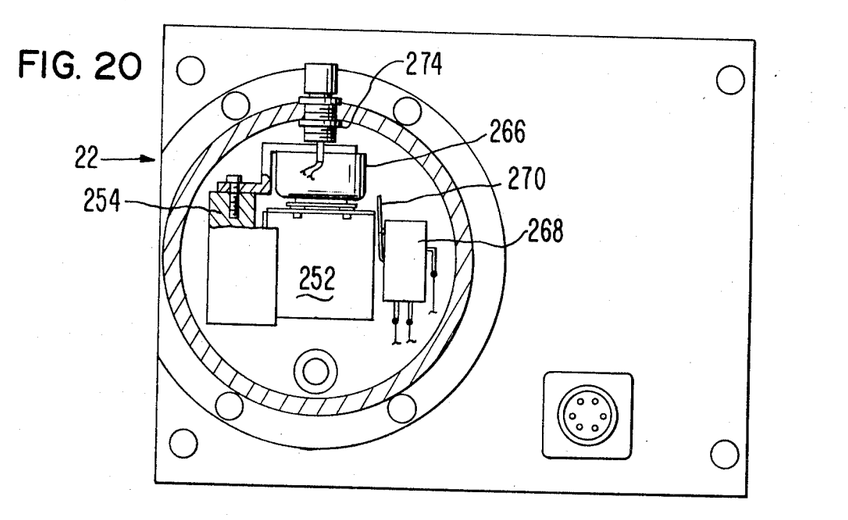
FIG. 20 is an end view of the shutter assembly of FIG. 19.

Details of the shutter assembly 22 are shown in FIGS. 19 and 20. As seen in FIGS. 19 and 21, the shutter assembly is located within a housing structure 264. The shutter 252 is rotated in and out of the incoming beam 250 by means of a rotary solenoid 256. A micro-switch 268 has a movable contact 270 which is in contact with the shutter 252 when the shutter 252 is in the closed position. When the shutter 252 is moved so as to allow the beam through the shutter assembly 222 the contact is broken with the movable contact 270 and a signal is sent to the operating console indicating that the shutter is open. This signal is independent of the command signal to open and shut the shutter.

The heat sink 254 includes a coolant circulating chamber 272 through which the coolant passes to remove the heat absorbed from the laser beam. Desirably, the water provided for cooling the shutter assembly 22 is the same water used for cooling the laser 16. A light 274 provides visual indication of the state of the shutter 252.

While one specific embodiment of the invention has been illustrated and described in detail herein, it is obvious that many modifications thereof may be made without departing from the spirit of the invention as described in the appended claims.

We claim:

1. In combination with a laser tool including a laser, and means for directing output beam of the laser onto a workpiece and wherein the improvement comprises a shutter assembly comprising:
   a. a shutter element located externally to the laser for controllably diverting the laser beam from said workpiece;
   b. a heat sink; and
   c. means for moving said shutter element between a first and second position, said first position being entirely out of the path of the laser beam thereby enabling the laser beam to be directed to said workpiece, and said second position intersecting the laser beam thereby diverting the laser beam from said workpiece and reflecting the beam upon said heat sink.

2. A shutter assembly as in claim 1 wherein said heat sink includes a passageway therein for the passage of a fluid coolant.

3. A shutter assembly as in claim 1 wherein said shutter element is pivoted about an axis into the incoming laser beam said axis being at a point along said shutter element such that the end of said shutter element which first intersects the laser beam is located between the laser and said axis.

4. A shutter assembly as in claim 3 including a blocking plate transversely mounted to the end of said heat sink at the exit end of said shutter assembly.

* * * * *